United States Patent
Dalla Torre et al.

[19]
[11] Patent Number: 6,153,677
[45] Date of Patent: *Nov. 28, 2000

[54] FLAME-RETARDANT THERMOPLASTIC POLYAMIDE MOLDING COMPOSITION AND ARTICLE MOLDED THEREFROM

[75] Inventors: Hans Dalla Torre; Daniel Capaul, both of Domat/Ems; Manfred Hewel, Rodels, all of Switzerland

[73] Assignee: EMS-Inventa AG, Zürich, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/555,934

[22] Filed: Nov. 9, 1995

Related U.S. Application Data

[63] Continuation-in-part of application No. 08/362,913, Dec. 23, 1994, abandoned.

[30] Foreign Application Priority Data

Dec. 23, 1993 [CH] Switzerland ............... 03841/93
Nov. 17, 1994 [DE] Germany ............... 44 41 022

[51] Int. Cl.$^7$ ............................................. C08K 5/49
[52] U.S. Cl. ............................................. 524/117; 524/606
[58] Field of Search ................ 524/117, 119, 524/606; 525/432

[56] References Cited

U.S. PATENT DOCUMENTS

| | | |
|---|---|---|
| 3,084,135 | 4/1963 | Scullin . |
| 3,270,016 | 8/1966 | Duennenberger et al. . |
| 3,418,267 | 12/1968 | Busse . |
| 3,778,407 | 12/1973 | Hild et al. . |
| 3,789,091 | 1/1974 | Anderson et al. . |
| 3,849,368 | 11/1974 | Anderson et al. ............ 524/119 |
| 3,951,908 | 4/1976 | Kaiser et al. . |
| 4,001,177 | 1/1977 | Tsutsumi et al. . |
| 4,002,580 | 1/1977 | Russo ............ 524/117 |
| 4,076,682 | 2/1978 | Theysohn et al. . |
| 4,093,588 | 6/1978 | Spivack et al. ............ 524/120 |
| 4,237,157 | 12/1980 | Hancock ............ 524/117 |
| 4,263,203 | 4/1981 | Hata et al. . |
| 4,369,305 | 1/1983 | Papilagen ............ 528/338 |
| 4,396,736 | 8/1983 | Dhein et al. . |
| 4,397,759 | 8/1983 | Hancock ............ 524/119 |
| 4,732,421 | 3/1988 | Hoppe et al. ............ 525/432 |
| 4,788,259 | 11/1988 | Nielinger et al. . |
| 4,937,315 | 6/1990 | Barthelemy ............ 525/432 |
| 5,206,310 | 4/1993 | Yasue et al. ............ 525/432 |
| 5,250,604 | 10/1993 | Moriwaki et al. ............ 525/432 |
| 5,264,544 | 11/1993 | Paschke et al. ............ 524/606 |
| 5,360,891 | 11/1994 | Wenzel et al. ............ 524/606 |

FOREIGN PATENT DOCUMENTS

| | | |
|---|---|---|
| 0044419B1 | 1/1982 | European Pat. Off. . |
| 0070001 | 1/1983 | European Pat. Off. . |
| 0242732 | 10/1987 | European Pat. Off. . |
| 0553581 | 8/1993 | European Pat. Off. . |
| 0628602 | 12/1994 | European Pat. Off. . |
| 2164579 | 8/1973 | France . |
| 1173641 | 7/1964 | Germany . |
| 1931387 | 12/1970 | Germany . |
| 1694254 | 6/1971 | Germany . |
| 1694494 | 8/1971 | Germany . |
| 2544219 | 4/1977 | Germany . |
| 2937379C2 | 4/1980 | Germany . |
| 3208486C2 | 9/1982 | Germany . |
| 3909145A1 | 9/1990 | Germany . |
| 4127112C1 | 8/1992 | Germany . |
| 44 06 857 | 6/1995 | Germany . |
| 61-009450 | 1/1986 | Japan . |
| 02-73832 | 3/1990 | Japan . |
| 2-73832 | 3/1990 | Japan ............ 524/117 |
| 2097008 | 10/1982 | United Kingdom . |
| WO92/13717 | 8/1992 | WIPO . |
| 93/18914 | 9/1993 | WIPO . |

OTHER PUBLICATIONS

Eng P. Chang et al–"Dynamic . . . Polystyrene" J. Applied Polymer Science, vol. 21, 2167–2180 (1977).

Billmeyer, Fred—Textbook of Polymer Science, 2nd ed. 1967, pp. 433–437.

*Primary Examiner*—Veronica P. Hoke
*Attorney, Agent, or Firm*—Venable; George H. Spencer; Ashley J. Wells

[57] ABSTRACT

A polyamide composition which is flame-retardant, includes several polyamides; and at least one flame-retarding additive which is at least one alkyl phosphonic acid compound having general formula (I):

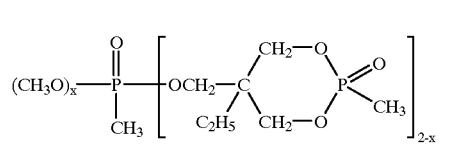

18 Claims, No Drawings

FLAME-RETARDANT THERMOPLASTIC POLYAMIDE MOLDING COMPOSITION AND ARTICLE MOLDED THEREFROM

This application is a Continuation-In-Part of application Ser. No. 08/362,913, filed Dec. 23, 1994 (now abandoned).

CROSS-REFERENCE TO RELATED APPLICATIONS

The present application claims the right of foreign priority with respect to Application No. 03 841/93-1 filed in Switzerland on Dec. 23, 1993 and Application No. 4441022.0 filed in Germany on Nov. 17, 1994, the subject matter of both of which is incorporated herein by reference.

BACKGROUND OF THE INVENTION

1. Field of the Invention

The invention relates to flame-retardant molding compositions and molded articles made from thermoplastic polyamides.

2. Description of the Related Art

The prior art recommends halogen compounds, usually in combination with antimony trioxide or formulations containing antimony trioxide, as flame retardants for the production of flame-resistant polycondensation products, e.g., see U.S. Pat. No. 3,418,267, German Published Patent Application No. 16 94 494, German Published Patent Application No. 19 31 387 (which corresponds to U.S. Pat. No. 3,778,407), and German Published Patent Application No. 25 44 219 (which corresponds to U.S. Pat. No. 4,076,682), the disclosures of which are incorporated herein by reference.

In spite of the fact that halogen compounds are very effective as flame retardants, their use entails considerable disadvantages. These are described in detail in European Patent No. 00 44 419 (which corresponds to U.S. Pat. No. 4,396,736) and the German Patent No. 32 08 486 (which corresponds to British Patent No. 2,097,008), the disclosures of which are incorporated herein by reference. If perbrominated aromatic compounds, such as, e. g., decabromodiphenyloxide, are used, a particularly serious disadvantage is the generation of toxic compounds such a dioxins and furanes during combustion which presents a severe public health hazard.

Apart from halogen compounds, the use of elemental phosphorus is known for imparting flame-resistant properties to thermoplastic materials, mainly to polyamide. This method is described in German Published Patent Application No. 11 73 641 and in U.S. Pat. No. 3,951,908, the disclosures of which are incorporated herein by reference. Here, a number of drawbacks must also be accepted during combustion, such as the generation of phosphine. Furthermore, color, as well as electric properties, of the polymeric materials employing such flame-retardants are influenced negatively. European Patent No. 00 44 419-B mentioned above provides information regarding this point.

Magnesium hydroxide and aluminum hydroxide, as well as nitrogen-containing compounds, such as melamine, melamine cyanurate and cyanoguanidine, are only suitable as flame retardants for polyamides under certain conditions. They must be used in large volumes in order to attain a satisfactory V0 rating according to Underwriter Laboratories specification UL-94. This changes the mechanical properties of the polyamides considerably, however.

Such flame retardants are proposed, inter alia, in U.S. Pat. No. 4,263,203, U.S. Pat. No. 4,001,177, German Published Patent Application No. 29 37 379 (which corresponds to U.S. Pat. No. 4,001,177), German Published Patent Application No. 16 94 254 (which corresponds to U.S. Pat. Nos. 3,084,135 and 3,270,016), German Patent No. 41 27 112, and German Published Patent Application No. 39 09 145, the disclosures of which are incorporated herein by reference.

U.S. Pat. No. 3,789,091 and U.S. Pat. No. 3,849,368 describe ring-shaped phosphoric acid esters as flame-retarding additives for various homopolymers, as well as for PA 6,6. The teachings of these patents do not lead to the solution of the special problems of providing polyamides which meet V0 standards. In semicrystalline polyamides, such compounds have the disadvantage of exhibiting a distinct migration.

It is therefore the object of the present invention to provide a polyamide, i.e., a polyamide composition, which is flame-retardant and meets V0 standards.

It is a further object of the present invention to provide flame-retarding molding materials and/or molded articles made from such a polyamide, which have good mechanical and thermal properties that meet the V0 standards according to UL-94.

It is yet another object of the present invention to provide flame-retarding molding materials and/or molded articles made from such a polyamide that do not exhibit any or substantial any migration of flame-retarding additive and, compared to polyamide containing no flame-retarding additive, have electrical properties which remain substantially unchanged.

SUMMARY OF THE INVENTION

These and other objects are accomplished by the present invention which provides a polyamide composition which is flame-retardant, comprising at least one polyamide; and at least one flame-retarding additive which is at least one alkyl phosphonic acid compound having general formula (I):

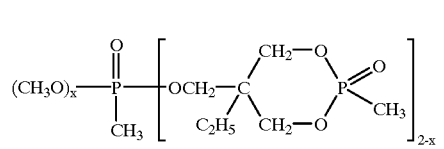

(I)

wherein X=0 or 1. Such a polyamide composition meets V0 standards according to UL-94.

The polyamide composition advantageously contains from about 0.5 to about 15.0 wt. % most preferably from about 4.0 to about 10.0 wt. %, of the at least one alkyl phosphonic acid compound based on the amount of the at least one polyamide.

The at least one polyamide may be at least one semicrystalline polyamnide and then includes monomeric units (a) selected from the group consisting of aliphatic diamines having 4 to 12 C atoms, cycloaliphatic diamines having 7 to 22 C atoms, and aromatic diamines having 6 to 22 C atoms, in combination with monomeric units (b) selected from the group consisting of aliphatic dicarboxylic acids having 4 to 12 C atoms, cycloaliphatic dicarboxylic acids having 8 to 24 C atoms, and aromatic dicarboxylic acids having 8 to 20 C atoms.

The at least one polyamide may be at least one semicrystalline polyamide, and then the at least one semicrystalline polyamide may be based on at least one polyamide selected from the group consisting of PA 6, PA 11, PA 12, PA 46, PA 66, PA 69, PA 610, PA 612, and PA 1212 in which the designation "PA" stands for "polyamide", in particular the synthetic polyamides known as "nylon" and alternatively referred to as, for example, "1212 nylon".

The at least one polyamide may be a blend of at least one semicrystalline polyamide and at least one amorphous polyamide. Thus, the polyamide may advantageously be a blend of from about 40 to about 95 wt. % of at least one semicrystalline polyamide; and from about 2 to about 30 wt. % of at least one polyamide selected from the group consisting of amorphous polyamides and amorphous copolyamides it being understood that, as used herein, "at least one amorphous polyamide" is intended to stand for at least one amorphous polyamide, at least one amorphous copolyamide, and blends thereof.

The at least one polyamide selected from the group consisting of amorphous polyamides and amorphous copolyamides may advantageously include monomeric units (a) selected from the group consisting of hexamethylenediamine, and derivatives of hexamethylenediamine, in combination with monomeric units (b) selected from the group consisting of aliphatic dicarboxylic acids having 4 to 36 C atoms, and aromatic dicarboxylic acids having 8 to 20 C atoms. Preferably then, the monomeric units (a) are selected from the group consisting of 1,6-diamino-2,2',4-trimethylhexane, 1,6-diamino-2,4,4,-trimethylhexane, bis-(p-aminocyclohexyl)-methane, derivatives of bis-(p-aminocyclohexyl)-methane, 3,3'-dimethyl-4,4'-diamino-dicyclohexylmethane, 3-aminomethyl-3,5,5-trimethylcyclohexylamine (isophorone-diamine).

The at least one polyarnide selected from the group consisting of amorphous polyamides and amorphous copolyamides may advantageously be selected from the group consisting of PA12/MACMI, PA 12/MACMT, PA12/MACMI/MACMT, PA 6I, PA 6I/6T, PA 12/MACM36, PA NDT/INDT, and PA 61/6T/MACMI.

These abbreviations are the official ISO 1874 1 abbreviations and correspond to the following full nomenclature:

PA12/MACM are polyamide copolymers based on laurolactam, 3,3'-dimethyl-4,4'-diaminodicyclohexylmethan and terephthalic acid.

PA12/MACMT are polyamide copolymers based on laurolactam, 3,3'-dimethyl-4,4'-diaminodicyclpohexylmethan, and terephthalic acid.

PA12/MACMI/MACMT are polyamide copolymers based on laurolactam 3,3'-dimethyl-4,4'-diaminodicyclohexylmethane, isophthalic acid, 3,3' dimethyl-4,4-diaminodicyclohexyl-methane and terphtalic acid.

PA 61 is a polyamide homopolymer based on hexamethylene-diamine and isophtalic acid.

PA61/6T are polyamide copolymers based on hexamethylene-diamine, isophthalic acid and hexamethylenediamine, terephthalic acid.

PA12/MACM36 are polyamide copolymers based on laurolactam, 3,3' dimethyl-4,4'-diaminodicyclohexylmethan and C 36 dimeric acid.

PA NDT/INDT are polyamide copolymers based on 1,6-diamino-2,2,4 trimethylhexane, terephthalic acid, 1,6-Diamino-2,4,4-trime-thylhexane and terephthalic acid.

PA 61/6T/MACMI are polyamide copolymers based on hexamethylene diamine isophthalic acid, hexamethylene-diamine terephthalic acid 3,3'-dimethyl-4,4' diaminodicyclohexyl-methane and isophthalic acid.

Preferably, the at least one flame-retarding additive is an ester of an aliphatic polyol and an alkylated phosphonic acid. Most preferably, the at least one flame-retarding additive is a trimethylpropanol ester of a methylphosphonic acid. Especially preferred is at least one flame-retarding additive which contains methylphouphonic acid-bis[(5-ethyl-2-methyl-1,3,2-dioxaphosphorinan-5-yl)-methyl]ester-P,P'-dioxide, a monomer of methylphosphonic acid-bis[(5-ethyl-2-methyl-1,3,2-dioxaphosphorinan-5-yl)-methyl]ester-P,P'-is dioxide, and mixtures thereof.

The objects of the invention are additionally accomplished by the present invention which provides a molded article, comprising the polyamide composition described above. The molded article may advantageously be comprised of a blend of materials, comprising the polyamide composition described above; and at least one further polymer selected from the group consisting of PA (polyamide), PET (polyethylene terephthalate), PBT (polybutylene terephthalate), PC (polycarbonate), PVC (polyvinyl chloride), PVA polyvinyl acetate), PU (polyurethane), PE (polyethylene), PP (polypropylene), and PPS (polyphenylene sulfide).

The blend of materials may advantageously further comprises at least one additive selected from the group consisting of impact modifiers, plasticizers, stabilizers, reinforcing materials, pigments, dyes, and fillers, which at least one additive functions as a modifier for the blend of materials as is known in the art.

The present invention additionally provides a method of increasing flame-retardance of a molded article, comprising providing the polyamide composition described above; and molding an article therefrom. The molded article may be selected from the group consisting of filaments, cables, connectors, and panels.

The present invention additionally provides a method of increasing flame-retardance of one of a polyamide composition or a molded article molded from a polyamide composition, comprising including in the polyamide composition at least one alkyl phosphonic acid compound having general formula (I). Preferably the at least one alkyl phosphonic acid compound is a trimethylolpropane ester of a methylphosphonic acid, and the one of a polyamide composition or a molded article molded from a polyamide composition satisfies V0 standards according to UL-94.

DESCRIPTION OF THE PREFERRED EMBODIMENTS

Thus, the object is solved, in particular, by non-migrating phosphonic acid compounds as flame-retardant additives for polyamides. It is therefore a special advantage of the molding materials or molded parts according to the invention that they do not have any disturbing plate-out, that is, migration of flame-retarding additives to the surface.

The inventive flame retardant polyamide composition is unique in that phosphoric acid compound migration is nil or substantially nil. This is attributed to salvation of the phosphoric acid compound in the amorphous polyamide constituent of the inventive composition.

A further advantage is the fact that the mechanical and electrical properties of the polyamides or their molded parts remain practically unchanged due to the flame-retarding additives.

It is also particularly advantageous that additive portions of 0.5 to 15.0 wt. % preferably 4.0 to 10.0 wt. %, most preferably 4.0 to 8.0 wt. %, relative to the polyamide content, already modify the molding materials or molded parts according to the invention to imparting flame-retardant properties which meet the V0 rating of UL-94. This V0 rating relates to test bars having a thickness of <0.8 mm.

For a polyamide blend based on PA 6 or PA 12, approximately 5.0 wt. % of the flame-retarding additive already suffices to attain the V0 value in the UL-94 flammability test.

The thermoplastic polyamides, as well as the flame-retarding molding materials or molded parts, may be blends of (a) 40 to 98 wt. % of a semicrystalline polyamide, and (b) 2 to 60 wt. % of an amorphous polyamide or copolyamide.

Preferred semicrystalline polyamides are the semicrystalline homopolyamides PA 6, PA 11, PA 12, PA 66, PA 69, PA 610, PA 612, PA 1212, and PA 46, but also those consisting of monomeric units of the group of aliphatic diamines with 4 to 12 C atoms, cycloaliphatic diamines with 7 to 22 C atoms, and aromatic diamines with 6 to 22 C atoms, in combination with monomeric units of the group of aliphatic dicarboxylic acids with 4 to 12 C atoms, cycloaliphatic dicarboxylic acids with 8 to 24 C atoms, and aromatic dicarboxylic acids with 8 to 20 C atoms.

Suitable amorphous polyamide types are the poyamides PA 12/MACMI (PA 12/bis(methyl-para-aminocyclohexyl) methane, isophthalic acid), PA 12/MACMT (PA 12/bis (methyl-para-aminocyclohexyl)methane, terephthalic acid), PA 12/MACMI/MACMT, PA 6I (HMD, isophthalic acid), PA 6I/6T (HMD, isophthalic acid/HMD, terephthalic acid), PA 12/MACM36 (PA 12/bis(methyl-para-aminocyclohexyl) methane, C-36 diacid=Dimeric acid), PA NDT/INDT (PA trimethylhexamethylene-diamine/terephthalic acid, isotrimethylhexamethylene-diamine, terephthalicacid); PA 6I/6T/MACMI (HMD, isophthalic acid/HMD, terephthalic acid/bis(methyl-para-aminocyclohexyl)methane, isophthalic acid). Also suitable are those consisting of monomeric units of hexamthylenediamine (=HMD) and its derivatives, such as 1,6-diamino-2,2,4 -trimethylhexane, 1,6-diamino-2,4,4-trimethylhexane, and bis-(p-aminocyclohexyl)methane and its derivatives, and homologs, such as 3,3'-dimethyl-4,4'-diamino-dicyclohexylmethane, 3-aminomethyl-3,5,5-trimethylcyclohexylamine (isophoronediamine), in combination with aliphatic or aromatic dicarboxylic acids with 4 to 36 or 8 to 20 carbon atoms (see also ISO Standard 1874).

The flame-retarding additive belongs to the group of aliphatic polyol esters of an alkylated phosphonic acid. According to formula I, the preferred additive is the trimethylolpropanol ester of the methyl phosphonic acid or the methyl phosphonic acid-bis[(5-ethyl-2-methyl-1,3,2-dioxaphosphorinan-5-yl)-methyl] ester-P,P'-dioxide having the empirical formula $C_{15}H_{31}O_9P_3$, which is distributed under the tradename ANTIELAZE 1045 by the Company Albright & Wilson, U.S.A. (CAS: 42595-45-9), its monomer or mixtures thereof:

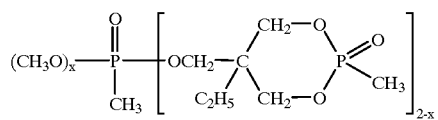

wherein X=0 or 1.

The thermoplastic molding materials or molded parts according to the invention may contain customary additives and processing aids such as stabilizers, oxidation inhibitors, agents to prevent heat decomposition and decomposition caused by ultraviolet light, lubricants and release agents, pigments, plasticizers, impact modifiers, fibrous and powdered fillers, and reinforcing materials, as well as conductivity additives. The portion of these known additives normally does not exceed 50 wt. % relative to the total weight of the molding materials.

As explained above, the molding materials or molded parts according to the invention may contain state-of-the-art additives that are processing-related or necessary for the application. Given the same prerequisites, the molding materials or the molded parts, which may be made of a blend of the additives according to the invention, may also contain further polymers from the group PA, PET, PBT, PC, PVC, PVA, PU, PS, PP, PPS. These blends, in turn, may be modified with additives from the group of impact modifiers, plasticizers, stabilizers, reinforcing materials, pigments, dyes, and fillers.

The molding materials or molded parts contain the alkyl phosphonic acid compound in portions of 0.5 to 15.0 wt. % relative to the polyamide content. Particularly preferable are molding materials or molded parts which contain alkyl phosphonic acid compounds in portions of 4.0 to 10.0 wt. %, particularly 5.0 wt. %, relative to the polyamide content.

The molded parts according to the invention may be produced by means of state-of-the-art processes, such as injection molding, extrusion, coextrusion, blow molding or forming.

The invention also relates to the use of alkyl phosphonic acid esters from an aliphatic polyol and an alkylated phosphonic acid as flame-retarding additive for the production of molded parts made from polyamides. Examples of molded parts include but are not limited to are filaments, cables, plugs (or connectors), panels (or slabs and plates) and the like.

EXAMPLES 1–5
Production of Polyamide Blends

A granulate mix of the type GRILAMID L20 (component A) and of the transparent type TR55 (component B) was melted in a WPF-ZSK 30 extruder. In this process, the flame-retardant ANTIBLAZE 1045 (component B) was added to the melt with a heatable metering unit.

The strand taken off the extruder was cooled in a water bath and granulated in a conventional granulator. DIN test bars were produced with an ARBURG 320/210/750 injection molding machine to measure the respective properties.

Component A

Component A was polyamide 12 (GRILAMID L20 made by EMS-CHEMIE AG, Zurich) having a relative viscosity of 2.0 (0.5g/100ml in m-cresol at 23° C.) or polyamide 6 (GRILON P40 made by the EMS-CHEMIE AG, Zurich) having a relative viscosity of 4.0 (1% in $H_2SO_4$)

Component B

Component B was transparent CoPA 12/MACMI (GRILAMID TR55 made by the EMS-CHEMIR AG, Zurich).

Component C

Component C was ANTIBLAZE 1045 flame retardant made by Albright & Wilson.

Compared to the reference examples, Examples 1–4 according to the invention show hardly any change in the mechanical properties, they have identical electrical properties, a satisfactory V0 rating according to UL-94 and practically no migration of flame-retarding additive.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

sisting of 6 nylon, 12 nylon, 66 nylon, 69 nylon, 610 nylon, 612 nylon, and 1212 nylon; and b. from about 5 to about 30 wt % of at least one amorphous polyamide based on Bis(3-methyl4-aminocyclohexyl)-methane the method comprising:

|  |  |  | Comparison 1 | Comparison 2 | Comparison 3 | Comparison 4 | 1 | 2 | 3 | 4 |
|---|---|---|---|---|---|---|---|---|---|---|
| Composition of molding materials |  |  |  |  |  |  |  |  |  |  |
| GRILAMID L20 (wt. %) |  |  | 100 | 96 | 92 | 0 | 84 | 74 | 75 | 0 |
| GRILON F40 (wt. %) |  |  | 0 | 0 | 0 | 100 | 0 | 0 | 0 | 84 |
| GRILAMID TR55 (wt. %) |  |  | 0 | 0 | 0 | 0 | 10 | 20 | 17 | 10 |
| ANTIBLAZE 1045 (wt. %) |  |  | 0 | 4 | 8 | 0 | 6 | 6 | 8 | 6 |
| Notched bar impact strength | dry | kJ/m$^2$ | 5 | 7 | 7 | 5 | 6 | 4.5 | 4 | 2.5 |
| (DIN 53453) | cond. | kJ/m$^2$ |  |  | 8 | 25 | 7 | 6 | 6 | 0.8 |
| Elongation at break | dry | % | >200 | 170 | 220 | 100 | 210 | 190 | 190 | 20 |
| (ISO 527) | cond. | % | >200 | 170 | 220 | 300 | 220 | 190 | 190 | 80 |
| Modulus of elasticity | dry | N/mm$^2$ | 1200 | 1150 | 1100 | 3000 | 1450 | 1600 | 1400 | 3300 |
| in tension |  |  |  |  |  |  |  |  |  |  |
| (ISO 527) | cond. | N/mm$^2$ | 1100 | 800 | 800 | 900 | 100 | 1200 | 1100 | 650 |
| Dielectric strength | dry | kV/mm | 32 |  | 32 | 35 |  |  | 31 |  |
| (IEC 243-1) | cond. | kV/mm | 32 |  |  | 30 |  |  | 31 |  |
| Flammability test UL-94 | 7T/70° C. | 0.8 mm | HB | V0 | V0 | V2 | V0 | V0 | V0 | V2 |
|  | 48 h/NK | 0.8 mm | HB | V0 | V0 | V2 | V0 | V0 | V0 | V0 |
| Migration at 110° C. |  |  | ++ | − | −− | ++ | + | ++ | ++ | + |
| (4 weeks) |  |  |  |  |  |  |  |  |  |  |

Legend for migration:
−− very strong
− strong
○ medium
+ little
++ none

What is claimed is:

1. A polyamide composition which is flame retardant, semi-crystalline, non-sticky, surface deposit-free, and flame-retarding additive migration-free, comprising:
   a. from about 40 to about 93 wt. % of at least one semicrystalline polyamide selected from the group consisting of 6 nylon, 12 nylon, 66 nylon, 69 nylon, 610 nylon, 612 nylon, and 1212 nylon;
   b. from about 5 to about 30 wt % of at least one amorphous polyamide based on Bis(3-methyl-4-aminocyclohexyl)-methane;
   c. from about 2 to about 30 wt % of a flame-retarding additive which is a transparent liquid and which is an ester of at least one alkyl phosphoric acid compound having general formula (I):

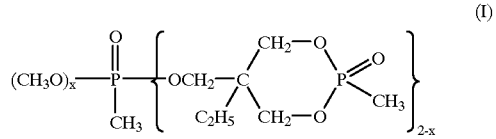

wherein X=0or 1, and
wherein at least one of the CH$_3$-group and the C$_2$H$_5$- group may be substituted by another alkyl group having from 1–5 carbon atoms in an amount ranging from 2 to 30 wt % of the additive.

2. A method of increasing flame-retardance of one of a polyamide composition comprised of:
   a. from about 40 to about 93 wt % of at least one semicrystalline polyamide selected from the group conincorporating in the polyamide composition from about 2 to about 30 wt % of a flame-retarding additive which is a transparent liquid and which is an ester of at least one alkyl phosphoric acid compound having general formula (I):

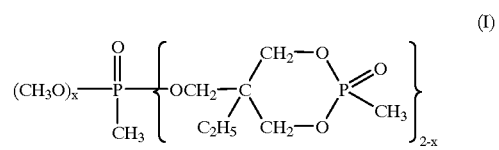

wherein X=0 or 1, and
wherein at least one of the CH$_3$-group and the C$_2$H$_5$- group may be substituted by another alkyl group having from 1–5 carbon atoms in an amount ranging form 2 to 30 wt % of the additive so that the polyamide composition is flame-retardant, semicrystalline, non-sticky, surface deposit free, and flame retardant additive migration-free.

3. The polyamide composition as defined in claim 1, wherein the polyamide composition contains from about 2.0 to about 15.0 wt. % of the at least one alkyl phosphoric acid compound.

4. The polyamide composition as defined in claim 1, wherein the polyamide composition contains from about 4.0 to about 10.0 wt. % of the at least one alkyl phosphoric acid.

5. The polyamide composition as defined claim 1, wherein the polyamide composition comprises from about 40 to about 93 wt. % of the at least one semicrystalline polyamide, and wherein the combined amounts of the at least one semicrystalline polyamide, the at least one amorphous polyamide, and the flame-retarding additive totals 100 wt. % relative to one another.

6. The polyamide composition as defined in claim 1, wherein the flame-retarding additive is an ester of an aliphatic polyol and an alkylated phosphoric acid.

7. The polyamide composition as defined in claim 1, wherein the flame-retarding additive is a trimethylpropanol ester of a methylphosphonic acid.

8. The polyamide composition as defined in claim 1, wherein the at least one alkyl phosphoric acid compound is selected from the group consisting of methylphosphonic acid-bis[(5-ethyl-2-methyl-1,3,2-dioxaphosphorinan-5-yl)-methyl]ester-P,P'-dioxide, and a monomer of methylphosphonic acid-bis[(5-ethyl-2-methyl-1,3,2-dioxaphosphorinan-5-yl)-methyl]ester-P,P'-dioxide.

9. A molded article, comprising:
the polyamide composition according to claim 1.

10. The molded article as defined in claim 9, wherein the polyamide composition contains from about 2.0 to about 15.0 wt. % of the at least one alkyl phosphoric acid compound.

11. The molded article as defined in claim 9, wherein the polyamide composition contains from about 4.0 to about 10.0 wt. % of the at least one alkyl phosphoric acid compound.

12. A molded article which is comprised of a blend of materials, comprising:
the polyamide composition according to claim 1; and
at least one further polymer selected from the group consisting of polyamides, polyethylene terephthalates, polybutylene terephthalates, polycarbonates, polyvinyl chlorides, polyvinyl acetates, polyurethanes, polyethylenes, polypropylenes, and polyphenylene sulfides.

13. The molded article as defined in claim 12, wherein the blend of materials further comprises at least one additive selected from the group consisting of impact modifiers, plasticizers, stabilizers, reinforcing materials, pigments, dyes, and fillers, which at least one additive functions as a modifier.

14. The molded article as defined in claim 12, wherein the polyamide composition contains from about 2.0 to about 15.0 wt. % of the at least one alkyl phosphoric acid compound.

15. The molded article as defined in claim 12, wherein the polyamide composition contains from about 4.0 to about 10.0 wt. % of the at least one alkyl phosphoric acid compound.

16. A method of increasing flame-retardance of a molded article, comprising:
providing the polyamide composition as defined in claim 1; and
molding an article from the polyamide composition.

17. The method as defined in claim 16, wherein the molded article is selected from the group consisting of filaments, cables, connectors, and panels.

18. The method as defined in claim 2, wherein the at least one alkyl phosphoric acid compound is a trimethylolpropane ester of a methylphosphonic acid, and wherein the one of a polyamide composition or a molded article molded from a polyamide composition has a V-O rating in a UL-94 flammability test procedure.

* * * * *